United States Patent [19]

Grigortchak et al.

[11] Patent Number: 5,351,164

[45] Date of Patent: Sep. 27, 1994

[54] ELECTROLYTIC DOUBLE LAYER CAPACITOR

[75] Inventors: Ivan I. Grigortchak, Ivano-Frankovsk Region; Kornei D. Tovstjuk, Lvov; Zahar D. Kovalyuk, Cheznovtsy; Ivan D. Kozmik, Chernovtsy; Bogdan P. Bahmatyuk, Ivano-Frankovsk Region, all of Ukraine

[73] Assignee: T.N. Frantsevich Institute for Problems in Materials Science, Kiev,

[21] Appl. No.: 968,185

[22] Filed: Oct. 29, 1992

Related U.S. Application Data

[63] Continuation-in-part of Ser. No. 960,251, Oct. 13, 1992, which is a continuation of Ser. No. 783,850, Oct. 29, 1991, abandoned.

[51] Int. Cl.$^5$ ............................................... H01G 9/00
[52] U.S. Cl. ..................................... 361/502; 29/25.03
[58] Field of Search .............................. 361/502–507; 429/218, 194; 29/25.03

[56] References Cited

U.S. PATENT DOCUMENTS

| | | | |
|---|---|---|---|
| 3,634,736 | 1/1972 | Boos et al. | 361/502 |
| 3,652,902 | 3/1972 | Hart et al. | 361/502 |
| 3,688,109 | 8/1972 | Gamble | 378/84 |
| 3,933,688 | 1/1976 | Dines | 252/520 |
| 4,049,887 | 9/1977 | Whittingham | 429/112 |
| 4,203,861 | 5/1980 | Thorp et al. | 252/182.1 |
| 4,229,509 | 10/1980 | Margalit | 429/194 |
| 4,233,377 | 11/1980 | Haering et al. | 429/218 |
| 4,309,491 | 1/1982 | Brec et al. | 429/218 |
| 4,385,103 | 5/1983 | Louzos et al. | 429/197 |
| 4,416,915 | 11/1983 | Palmer et al. | 429/218 |
| 4,423,124 | 12/1983 | Dey | 429/194 |
| 4,444,857 | 4/1984 | Duchange et al. | 429/191 |
| 4,707,422 | 11/1987 | de Neufville et al. | 429/48 |
| 4,948,685 | 8/1990 | Ohsawa et al. | 429/213 |
| 5,103,379 | 4/1992 | Kurabayashi et al. | 361/502 |

FOREIGN PATENT DOCUMENTS

| | | |
|---|---|---|
| 0176692 | 4/1986 | European Pat. Off. . |
| 2-227467 | 7/1987 | European Pat. Off. . |
| 1-3942553 | 6/1991 | Fed. Rep. of Germany . |
| 2113914 | 8/1983 | United Kingdom . |

OTHER PUBLICATIONS

C. Julien et al. "Studies of Lithium Insertion in Bismuth Chalcogenide" *Solid State Ionics*, 36($\frac{1}{2}$):113–120, (Oct. 1989).

K. M. Paraskevopolous et al. "Study of Lithium Intercalation in Bismuth Diselenide" *Microionics–Solid State Batteries*, pp. 343–361. Elsevier Science Publishers MB.V., (1991).

B. A. Lukiyanets "Charge Distribution of Electrons at Intercalated Atoms in Layer Crystals", *Phys. Stat. Sol(b)*, 163:171, (1991).

M. F. Omelyan et al. "Change in the Electronic Subsystem Energy by Intercalation of Layered Crystals", *Phys. Stat. Sol(b)*, 159:K73, (1990).

M. Lazzari et al. "A Cyclable Lithium Organic Electrolyte Cell Based on Two Intercalation Electrodes", *J. Electrochem. Soc.*, pp. 773–774 (Mar. 1980).

B. A. Lukiyanets et al. "Conductivity Along the O–Azis of Layered Crystals During Their Intercalation", *Chem. Abs.*, 41:81–83, (1990).

I. Grigortchak et al. "Effect of Intercalation by Lithium on Fermi–Level Position and Free Charge–Carrier Concentration in Bismuth Telluride", *Chem. Abs.* 23(11):2083–2085, (1989).

*Primary Examiner*—Bruce A. Reynolds
*Assistant Examiner*—Michael D. Switzer
*Attorney, Agent, or Firm*—Choate, Hall & Stewart

[57] ABSTRACT

A double layer electrolytic capacitor of two electrodes each in contact with a common electrolyte. At least one of the electrodes is comprised of a crystalline material characterized by the presence of van der Waals channels in the material. These van der Waals channels are adapted to accommodate the electrolyte within the channels, such that a double layer of charge is formed at interfaces of the van der Waals channels and the electrolyte when a voltage is applied between the two electrodes.

22 Claims, 3 Drawing Sheets

ELECTROLYTIC DOUBLE LAYER CAPACITOR

This application is a continuation-in-part application of copending U.S. patent application Ser. No. 07/960,251, filed Oct. 13, 1992, which is a continuation of U.S. patent application Ser. No. 07/783,850, fled Oct. 29, 1991, now abandoned.

BACKGROUND OF THE INVENTION

This invention relates to double layer capacitors, and more particularly relates to high-energy, high-power electrolytic capacitors.

Conventional electrolytic capacitors store energy by accommodating a so-called double layer of charge at the interface of each capacitor electrode surface and the electrolytic solution between the electrodes. The electrode surface area thus limits the energy storage capacity of such capacitors; the larger the electrode surface area, the larger the double layer of charge which may be generated, and hence the greater the energy storage of the capacitor. Typical applications restrict the practical limit of a capacitor's physical size, however, and thereby limit the achievable energy storage capacity provided by the macroscopic surfaces of the capacitor.

One double layer capacitor design which overcomes the macroscopic capacitor surface area limitation employs powdered electrode materials, e.g., high-area, activated carbon particles, to microscopically increase the surface area of the capacitor electrodes. In such a capacitor, the carbon particles are bound together to form a porous electrode structure in which the exposed surfaces of the particles contribute to the overall electrode surface area. The internal resistance and capacitance of the porous electrode structure is a complicated function of the carbon particles' structure and configuration.

SUMMARY OF THE INVENTION

In general, in one aspect, the invention provides a double layer electrolytic capacitor of two electrodes each in contact with a common liquid electrolyte. At least one of the electrodes comprises a crystalline material characterized by the presence of van der Waals channels in the material. These van der Waals channels are adapted to accommodate the electrolyte within the channels, such that a double layer of charge is formed at interfaces of the van der Waals channels and the electrolyte when a voltage is applied between the two electrodes. This ability to utilize the van der Waals channels as extensions of the electrode's macroscopic surface provides a dramatic increase in capacitance over conventional double layer capacitors. Further detailed descriptions of compounds having van der Waals channels and devices which utilize these compounds are provided in the following applications, all filed of equal date as "Electrolytic Double Layer Capacitor", and hereby incorporated by reference: "Capacitive Thermoelectric Device" and "Energy Storage Device".

In preferred embodiments, one of the electrodes comprises the crystalline material and the other electrode is an electrically conducting container in which the electrolyte and the crystalline electrode are positioned; more preferably, both electrodes of the capacitor are composed of the crystalline material. Preferably, the electrodes are each composed of a monocrystal of the crystalline material. In other preferred embodiments, the two electrodes each are composed of monocrystalline powder particles of the crystalline material, the particles being approximately 70 microns in a longest dimension. Preferably, the crystalline material is a bismuth chalcogenide, of $Bi_yCh_z$, where Ch is selected from the group consisting of Te and Se, y is 1 or 2, and z is in the range of 1 to 3.

In one preferred embodiment, the electrolyte is a 1.0 M $LiClO_4$ solution in propylene carbonate; in other embodiments, the electrolyte is a 1.2 M solution of organic cation of perchlorate in a mixture of propylene carbonate which is dissolved in dimethoxyethane, or an aqueous solution of potassium hydroxide.

Preferably, the electrodes' van der Waals channels are adapted to accommodate the electrolyte by a training process comprising intercalation of ions from the electrolyte into the van der Vaals channels, the voltage being sufficiently high to achieve electrolyte penetration of the channels. Preferably, the voltage is periodically reversed in polarity between the electrodes during the intercalation process. Most preferably, the voltage is applied to the electrodes for approximately 600 minutes, and the voltage polarity is reversed approximately every 30 minutes. This training process allows the electrolyte to penetrate the electrodes' van der Waals channels and form a double layer of charge at the channel surfaces, thereby dramatically increasing the total surface area of the electrode. Other features and advantages of the invention will be described in the following description and in the claims.

DESCRIPTION OF THE PREFERRED EMBODIMENT

Figure 1A:
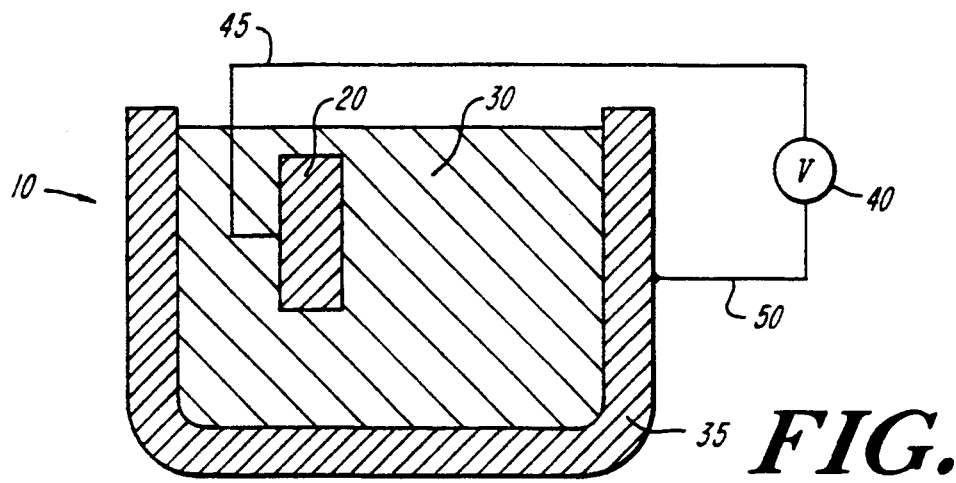
FIG. 1A is a schematic illustration of one embodiment of the capacitor of the invention.

As an example of limitation of capacitors, the capacitance of a typical parallel plate capacitor is given by:

$$C = \epsilon_0 \epsilon S/d,$$

where $\epsilon_0$ is the pemittivity in vacuum (a constant), $\epsilon$ is the dielectric constant of the medium between the capacitor electrodes, S is the surface area of the capacitor electrodes, and d is the width of the medium separating the electrodes. The capacitance, and correspondingly, the energy storage, of a given capacitor are thus limited by the geometry, i.e., the surface area, the electrode spacing, the material properties of the electrodes, and the medium separating them.

The definition of capacitance for a double layer capacitor is further specified by the structure of the charged double layer and its geometry. This double layer comprises charge accumulation on the electrode surface and accumulation of ions at the electrode surface-electrolyte interface. Thus, for double layer electrolytic capacitors, the width d in the capacitance equation is given by the distance between the centers of the two regions constituting the double layer.

The capacitor of the invention provides a dramatic increase in capacitance and energy storage by providing a corresponding increase in surface area of the capacitor electrodes and through proper selection of the electrodes and the electrolyte. Most notable of the invention's advantages is that the increased surface area does not rely on increasing the macroscopic dimensions of the electrodes, and further, does not rely on particle surface areas, as in typical carbon electrodes. Rather, the increased electrode surface area is obtained using a particular class of materials, namely intercalation compounds, which are characterized by a layered crystalline structure. The crystal layers of intercalation compounds comprise planes of molecules or atoms which are weakly bound together and separated from each other by van der Waals regions. These van der Waals regions form anisotropic channels in the crystal lattice between the planes of molecules or atoms, resulting, in effect, in a "two dimensional" crystal structure. Intercalation materials typically exhibit on the order of $10^6$–$10^7$ layers per millimeter of material thickness. Due to the weak van der Waals force between the crystal layers, the lattice channels can accommodate the physical introduction, or so-called intercalation, of a guest intercalant species into them.

In the capacitor electrodes of the invention, the van der Waals regions of the electrode material are manipulated such that the surfaces of the crystal lattice channels, although internal to the electrode material, contribute to the overall electrode surface area, and thereby increase the effective electrode surface area beyond that of its macroscopic surface. As described in detail below, surfaces of the van der Waals channels of the electrode material are capable of foxing a double layer with an electrolyte in exactly the same manner as the electrode macroscopic surface forms a double layer. Recognition and exploitation of this physical process has enabled the inventors herein to achieve the dramatic energy storage capability of the capacitor of the invention.

The inventors herein have recognized that a particular type of intercalation compound, namely bismuth chalcongenides, including $Bi_2Te_3$ and $Bi_2Se_3$, are particularly well-suited for providing van der Waals channels as an extension of electrode surface area. Electrodes composed of these materials, when used in combination with a suitable electrolyte, generate a highly uniform double layer of a desirable structure. As is well-known to those skilled in the art, bismuth chalcongenides exhibit a layered crystalline lattice which is layered at the molecular level, each layer being separated by a van der Waals channel having a width on the order of 3–4 Å. Further material properties of bismuth chalcogenides are given in the copending United States patent application entitled "Layered Crystalline Material Capable of High Guest Loading," herein incorporated by reference, being filed on the same day as the present application. Of the materials surveyed, the inventors have found that of the bismuth chalcogenides, $Bi_2Te_3$ exhibits the best electrical conductivity, and is thus most preferable as an electrode material, while $Bi_2Se_3$ exhibits a lower conductivity, and thus is less preferable as an electrode material.

The ability to manipulate the bismuth chalcogenides, and indeed any layered intercalation material, for employing their van der Waals channels to increase electrode surface area, is dramatically impacted by the purity and defect density of the chosen material. Impurities and crystal lattice defects distort the geometry of the van der Waals channels, rendering them less accessible to intercalating species, degrading the channel surface structure and thus degrading the electrical and mechanical properties of the channels. Accordingly, it is ideally preferred that the material chosen for the capacitor electrodes be prepared using unique processes, developed by the inventors herein, yielding a highly pure and as defect-free as possible monocrystalline material. To that end, the following single crystal growth process is preferred for bismuth chalcogenide materials. Alternative processes, providing less than ideally pure and defect-free material, may nonetheless be acceptable for particular capacitor applications. Those skilled in the art will recognize critical material parameters and corresponding performance results.

In the preferred intercalation compound preparation process, stoichiometric quantities of highly purified (99.9999% pure) bismuth and tellurium (or other selected chalcogenide) are first charged into a quartz ampoule. If necessary, the materials are zone refined before use. Off-stoichiometry results in an n- or p-doped material with the resultant degradation of the lattice structure and the associated performance. The ampoule is evacuated to $10^{-7}$ turning and backfilled to a pressure of $10^{-3}$ mmHg with a small amount of inert gas, such as argon, or a reducing gas, such as hydrogen (3–10 cycles), and then sealed. Hydrogen is particularly preferred because it reacts with oxygen during processing to prevent oxidation and decrease the segregation of chalcogenide by reducing its vapor pressure.

A highly homogeneous polycrystalline material is prepared in a first processing step. The sealed ampoule is placed in a furnace at room temperature and heated to a temperature 5°–10° C. above its melting point. The ramp rate, temperature and reaction time are dependent upon the final compound. The reaction conditions are listed in Table I for the preparation of polycrystalline $Bi_2S_3$, $Bi_2Se_3$, and $Bi_2Te_3$. The temperature of the furnace over the entire length of the ampoule is controlled to within ±0.5° C. Careful and accurate control of the temperature is important because of the high volatility of chalcogenides. Temperature variations along the ampoule length causes segregation of chalcogenide which leads to off-stoichiometry. To optimize the temperature control along the length of the ampoule, a long furnace can be used. Additional heating coils can be used at furnace ends to reduce the temperature gradient at the furnace exits.

TABLE I

| Processing conditions for polycrystalline material. | | | |
|---|---|---|---|
| processing conditions | $Bi_2Te_3$ | $Bi_2Se_3$ | $Bi_2Se_3$ |
| heating rate to $T_{liq}$ (°C./h) | 30 | 20 | 15 |
| exposure time (h) at $T_{liq}$ + 10° C. | 10 | 15 | 20 |
| cooling rate (°C./h) | 50 | 40 | 35 |

During the last hour of reaction time, the ampoule is agitated or vibrated to insure complete mixing of the ampoule components- The ampoule vibration is in the range of 25–100 Hz and is accomplished by fixing one end of the ampoule to an oscillation source. Any conventional vibration means is contemplated by the present invention. A far reaction is complete, the ampoule is cooled at a slow controlled rate.

Once a homogeneous polycrystalline material is obtained, it can be further processed into a highly defect-free bismuth chalcogenide single crystal. Any known method of growing single crystals can be used, such as Bridgeman techniques, Czolchralski process and zone refinement (recrystallization). In particular zone refinement has proved to be highly effective in obtaining high purity single crystals.

Zone refinement is preferably carried out in a quartz boat containing a seed crystal of the desired lattice structure, e.g., the hexagonal lattice structure.. It is recommended that dean rooms levels of Class 100 be maintained. The seed crystal is oriented in the boat such that crystal layers are horizontal. The entire apparatus should be shockmounted to insulate against environmental vibrations. The boule of polycrystalline material is positioned in surface contact with the seed crystal.

The furnace comprises two parts, an outer furnace for maintaining an elevated temperature along the entire boule length and a narrow zone movable in a direction for heating a small portion of the polycrystalline material. The outer furnace is maintained at 35° C. below the melting point and the zone, which is 2–3 cm in length, is held at 10° C. above the melting point of the polycrystalline material. Unlike for the preparation of the polycrystalline material, in the first processing step described above, the boule can be rapidly heated to the operating temperature. The zone is initially positioned at the seed crystal/boule interface and this region is heated to the melting point of the material. The zone is moved slowly down the length of the boule. Zone travel rate varies with composition, and exemplary rates are shown, along with other processing parameters, in Table II. Zone travel rate is an important processing parameter. If it is too great, crystallization is incomplete and defects are formed. If it is too slow, layer distortions result. The lower portion of the heat-treated boule in contact with the quartz boat is preferably removed before use.

TABLE II

Processing conditions for hexagonal single crystal growth.

| processing conditions | $Bi_2Te_3$ | $Bi_2Se_3$ | $Bi_2Se_3$ |
|---|---|---|---|
| boule temperature | $M_p - 35°$ C. | $M_p - 35°$ C. | $M_p - 35°$ C. |
| zone temperature | $M_p + 10°$ C. | $M_p + 10°$ C. | $M_p + 10°$ C. |
| zone travel rate | 8 mm/hr | 6 mm/hr | 3 mm/hr |
| cooling rate | 50° C./hr | 40° C./hr | 35° C./hr |

The above process can be modified slightly to produce crystals of rhombohedral structure, in which case a rhombohedral seed crystal is used in the zone refinement process. In addition, to obtain rhombohedral crystals, the furnace temperature is held at 30° C. below the melting point and the zone is maintained at the melting point of the polycrystalline material.

Preferably, a monocrystalline intercalation compound, and most preferably, bismuth chalcogenide, is grown using the process described above to produce monocrystalline electrode structures. For example, as one embodiment of the invention, monocrystalline bismuth chalcogenide electrodes are produced having a rectangular geometry with sides of 4 millimeters-long and 5 millimeters-long, and having a thickness of between 0.5–1 millimeters. It is preferable to metalize one of the faces of the monocrystalline material which is perpendicular to the plane of the van der Waals channels within the crystal. This metalization may consist of, for example, a nickel paste, which is spread on the crystal to form a 10–20 micron-thick metal layer. The metalization provides both a good electrical contact to the crystalline piece and enhances the rigidity of the crystalline piece.

Alternatively, the monocrystalline bismuth chalcogenide material may be ground into a powder for forming the electrodes; such a powdered material is more easily manipulated than the single crystal material. The crystal grinding process may be carried out using, for example, a ball milling device, or other grinding device, to produce single crystal particles each having a diameter of preferably approximately 70 microns. Other particle diameters may be more preferable in specific instances. The crystal particles are then mixed with an appropriate compound to bind them together. While the binder acts, in effect, to "glue" the particles together, it must not completely electrically insulate the particles from each other. The binder material is selected according to the electrolyte. When an aprotic electrolyte solvent is used, the binder preferably consists of a 3% aqueous solution of carboxymethylcellulose, in which the particles are mixed; for other electrolytes, alternative binding agents, e.g., a 5% polyethylene dispersion in normal hexane, may be used. The resulting powder-binder mixture is placed into an electrode mold and then dried at room temperature. The electrode geometry, as determined by the mold, may be, for example, disc-shaped, as is conventional for capacitors, with an electrode thickness of between 0.3–1 millimeters. Alternative electrode geometries are also feasible.

The grinding process described above produces some mount of crystal damage, and corresponding crystal defects. However, because of the weakness of the van der Waals attractive force between the crystal layers of intercalation compounds, these compounds cleave readily along the axis of the channels without much danger of lattice damage or distortion.

Electrodes formed using the process described above may be employed in any of a variety of capacitor configurations. Referring to FIG. 1A (not shown to scale), in one configuration, a capacitor 10 including a bismuth chalcogenide electrode 20 is constructed as follows. The capacitor electrode 20, whether consisting of a monocrystalline piece or a molded crystal powder, is located in contact with a selected electrolyte 30, supported by an electrically conducting container 35. Ideally, this conducting container is composed of an ideally nonpolarizable material. A power supply 40, such as a battery, is electrically connected to the electrode 20 via a conductor 45, such as a wire, and correspondingly is connected to the conducting container 35 via a similar conductor 50.

The electrolyte 30 suitably consists of an aqueous solution of, e.g., alkali, or preferably, 1.0 M of $LiClO_4$ in propylene carbonate. A separator, consisting of 2 layers of non woven polypropylene, each layer 100 μm thick, and saturated with the electrolyte, provides mechanical support of the electrolyte. Alternatively, for various electrode materials, the electrolyte may comprises a 1.2 M solution of organic cation of perchlorate in a mixture of propylene carbonate in dimethoxyethane, an aqueous solution of potassium hydroxide, an aqueous solution of single valence metal sulphates, or other aqueous solution.

Figure 1B:
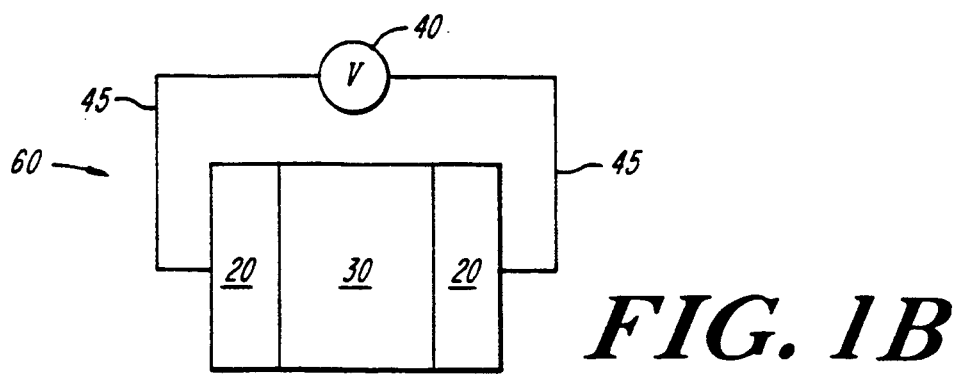
FIG. 1B is a schematic illustration of a second embodiment of the capacitor of the invention.

Referring also to FIG. 1B, in a second capacitor configuration 60, two identical bismuth chalcogenide electrodes 20 are separated by the electrolyte 30. Using the LiClO$_4$ propylene carbonate electrolyte discussed above, a polypropylene separator is suitably impregnated with the electrolyte solution and is positioned between the electrodes 20. The electrodes, held apart by the separator, are then inserted into a supporting frame (not shown) and sealed in a pressing form. The power supply 40 is electrically connected to each of the electrodes 20 via similar conductors 45, e.g., good conducting wires.

Before an electrolytic capacitor having electrodes of an intercalation compound, preferably bismuth chalcogenide, can provide increased surface area when operated as a capacitor, the bismuth chalcogenide van der Waals channels must be manipulated, or "trained", to provide the extended surfaces. As explained in the discussion above, the van der Waals channel surfaces, after being trained, can form a double layer with the electrolyte in a manner similar to that in which the electrode macroscopic surface forms a double layer. Accordingly, "training" is a process, described below, whereby electrolyte (and ions) are driven within the van der Waals channels to facilitate flow of electrolyte into and out of the channels.

Figure 2A:
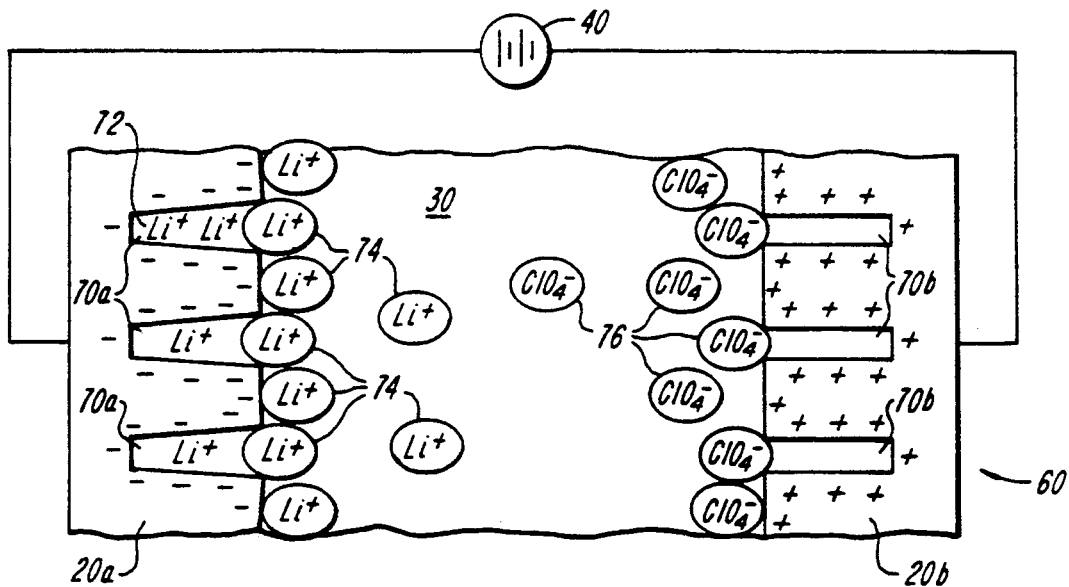
FIG. 2A is a schematic illustration of the capacitor of FIG. 1B at a first stage of training.

Referring to FIG. 2A, there is shown a capacitor 60 having two bismuth chalcogenide electrodes 20a, 20b at the start of the training process. The dimensions of the electrodes' van der Waals channels 70a, 70b are greatly exaggerated for clarity, and it must be recalled that each electrode is comprised of on the order of $10^6$–$10^7$ such channels. Between the two electrodes is positioned a LiClO$_4$-based electrolyte 30. During the training process, the power supply 40 is set to provide a voltage which is greater than the faraday potential for cation intercalation, and thus the voltage depends directly on the particular combination of capacitor electrode material and electrolyte employed. Given a particularly chosen electrode-electrolyte combination, those skilled in the art will recognize that the corresponding faraday potential may be determined in a standard table of material systems and faraday voltages.

At the start of the electrode training, when a voltage above the faraday voltage is applied to the capacitor, the electrode 20b connected to the positive terminal of the power supply accumulates a positive surface charge. The surfaces of the van der Waals channels 70b of the electrode likewise accumulate this positive surface charge. Correspondingly, both the macroscopic surface and the surfaces of the van der Waals channels 70a of the electrode 20a connected to the negative terminal of the power supply accumulate a negative surface charge.

In response to this surface charge configuration, free Li$^+$ ions 72 readily intercalate the negatively charged electrode 20a, because of the favorable charge and energy configuration, and because their ionic radius is relatively smaller than the width of the van der Waals channels. In addition, solvated Li$^+$ complexes 74 move toward the negatively charged electrode surface and solvated ClO$_4^-$ complexes 76 move toward the positively charged electrode surface. The positively charged electrode's van der Walls channels 70b, being 3-4 Å-wide (as occurring before the training process) are too small for the ClO$_4^-$ complexes to penetrate within them; the solvated Li$^+$ complexes, however, do to a small degree penetrate the 3-4 Å-wide channels 70a of the negatively charged electrode 20a, effectively being transported along with the free Li$^+$ ions to the electrode surface and within the electrode channels. As a result, the solvated Li$^+$ complexes slightly widen the channels that they partially enter in the negatively charged electrode.

In order to cause the solvated Li$^+$ complexes to penetrate the opposite electrode 20b, the polarity of the power supply is reversed. Then, the accumulated surface charge distribution reverses; the previously positively charged electrode now accumulates negative surface charge, and attracts the free Li$^+$ ions 72 and solvated complexes 74. The free Li$^+$ ions 72 readily intercalate the channels and the solvated complexes 74 again partially enter the corresponding van der Waals channels, and thereby slightly widen the channels.

Figure 2B:
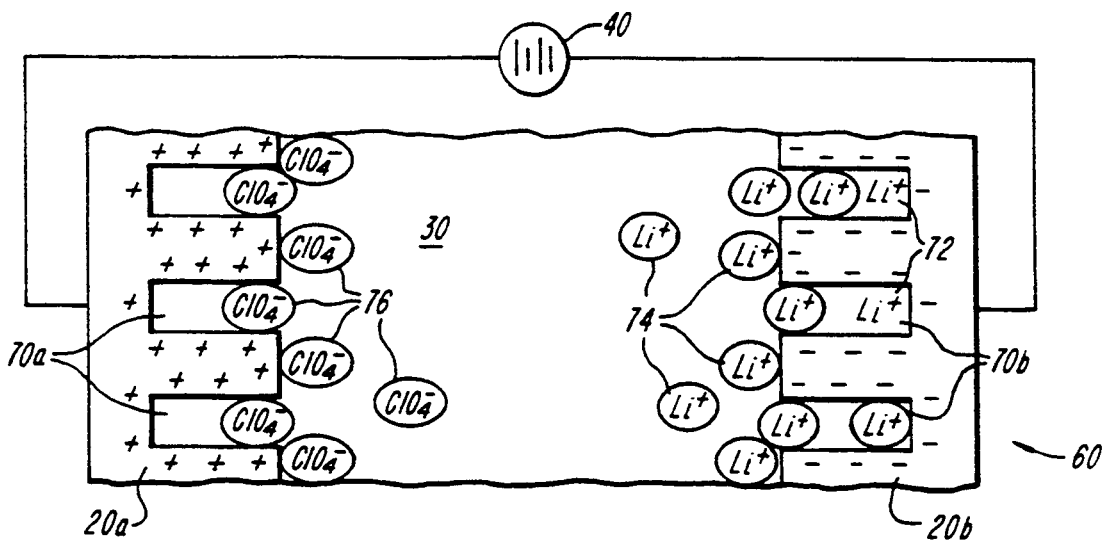
FIG. 2B is a schematic illustration of the capacitor of FIG. 2A at a later stage of training.

Referring to FIG. 2B, repetition of this process of voltage polarity switching progressively widens the van der Waals channels of each of the electrodes 20a, 20b. Throughout the process, the voltage may be increased, depending on the initially applied voltage, to thereby increase the attraction of the ions and electrolyte to the van der Waals channels. At an intermediate point in the training process, as depicted in the figure, the solvated Li$^+$ complexes 74, as well as the free Li$^+$ ions, will be able to completely penetrate the widened channels 70b of the electrode 70b which is currently negatively charged. The solvated ClO$_4^-$ complexes, being of a larger size than the solvated Li$^+$ complexes, will not yet be able to completely penetrate the channels of the currently positively charged electrode 70a, however.

Figure 2C:
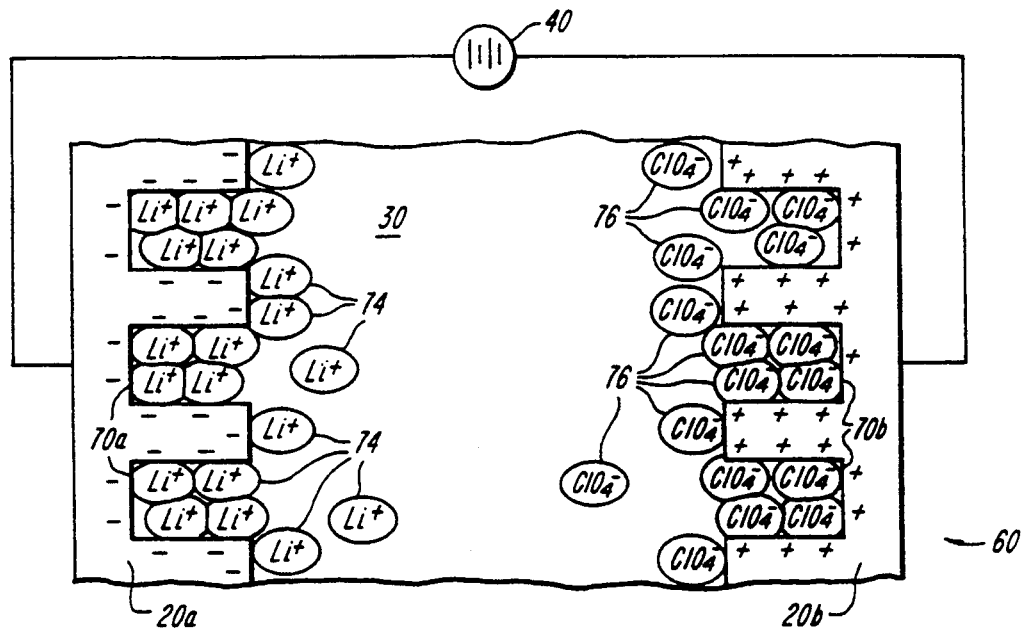
FIG. 2C is a schematic illustration of the capacitor of FIG. 2A at a final stage of training.
Figure 2D:
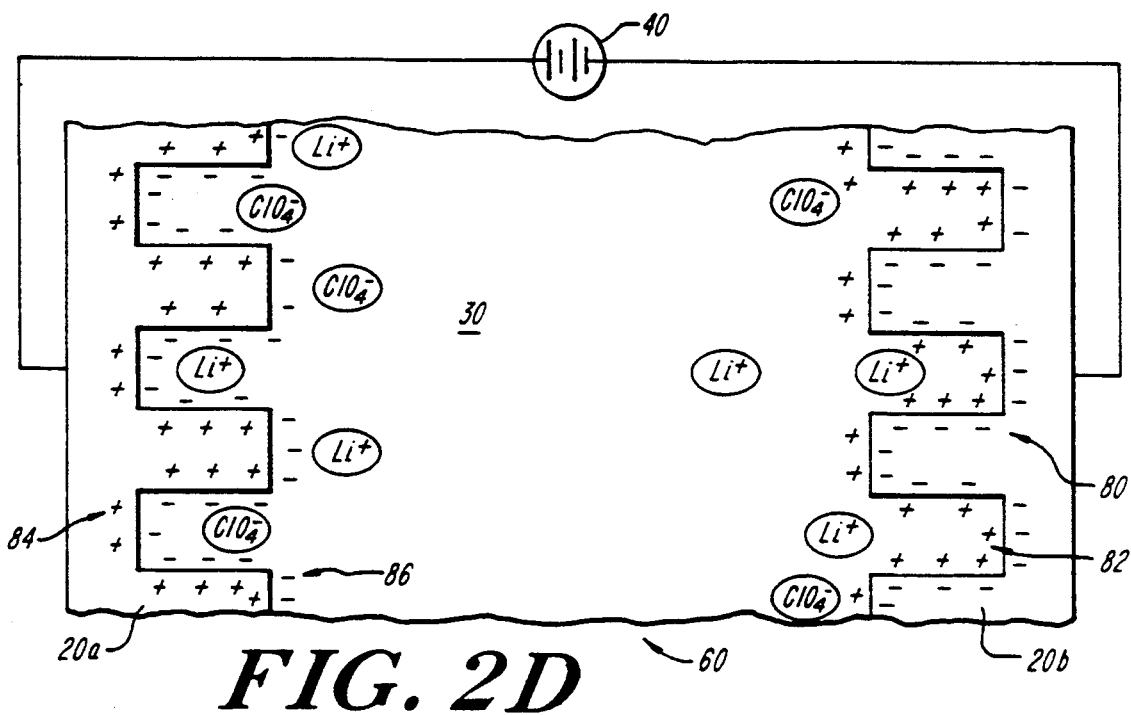
FIG. 2D is a schematic illustration of the capacitor of FIG. 2A including the formation of a double layer of charge.

At the end of the training process period, referring to FIG. 2C, both the solvated ClO$_4^-$ complexes 76 and the solvated Li$^+$ complexes 74 are able to completely penetrate the van der Waals channels 70a, 70b, of both electrodes, 20a, 20b. As shown in FIG. 2D, at this time, electrically neutral electrolyte (including both ClO$_4^-$ complexes 76 and Li$^+$ complexes 74) is thereby able to completely penetrate the van der Waals channels and create an electric double layer of charge 80, 82 and 84, 86 at the electrode-electrolyte interface throughout the van der Waals channels of each electrode, in a manner similar to that which occurs at the macroscopic surface of the electrodes. This penetration of electrolyte throughout the crystal channels forms the basis for achieving the significant capacitance and energy storage increases provided by the invention.

The extent of training required to achieve penetration of the electrolyte and its solvated ionic species within the electrodes' van der Waals channels is critically dependent on the particular combination of electrode material and electrolyte employed. The width of the electrode van der Waals channels before undergoing any training process and the radius of the solvated complexes in the electrolyte determine the training required; the larger the radius of the complexes and the smaller the van der Waals channels' width, the longer the training time requirement. For the electrode material Bi$_2$Te$_3$ and an electrolyte based on LiClO$_4$, the training preferably consists of about 20 training cycles of approximately 30 minutes each, where the polarity of the power supply is reversed with each cycle. For specific capacitance requirements, this training may be adjusted, however. With less training, a lower degree of electrolyte penetration within the channels would be achieved, and a correspondingly lower double layer capacitance would result. Thus, for achieving the maximum possible capacitance of a given electrode, the training should be maximized. Those skilled in the art will recognize that a preferable training procedure may be empirically determined for a given electrode-electrolyte combination and capacitance goal.

Alternative training processes are within the intended scope of the invention. For example, the voltage polarity may be maintained constant in the above process, or a charge-discharge process may be employed to widen the van der Waals channels. In such a process, a voltage above the faraday potential is applied between the electrodes, in the manner discussed above, for a period of time, and then the capacitor is discharged across an appropriate load. If the voltage polarity is maintained constant during this process, or if the voltage polarity is not switched during the training process first described, one of the electrodes may not achieve widened channels, depending on the electrode material and electrolyte composition. For example, using $Bi_2Te_3$ electrodes and a $LiClO_4$-based electrolyte in a training procedure in which the voltage polarity is constant, the electrode having the negative polarity will be intercalated with free and solvated $Li^+$ ions (and thereby accommodate electrolyte), but the electrode of positive polarity will not have the benefit of free and solvated $Li^+$ ions beginning to open its lattice channels, and thus the solvated $ClO_4^-$ ions will not widen those channels to accommodate electrolyte; as a result, the electrode of positive polarity will not provide the extended van der Waals surfaces. It must be noted that a capacitor of the design using a single intercalation compound-electrode (FIG. 1A) is also trained using the techniques described above. A process of voltage application and voltage polarity reversal will intercalate free and solvated $Li^+$ ions and solvated $ClO_4^-$ ions in the electrode, thereby providing the ability to accommodate electrolyte within the electrode and achieve the desired electrode surface extension.

Of particular importance is the fact that the training process does not deform or distort the crystal planes of the layered crystalline electrode material to any significant extent. The extent of crystal plane deformation is related to the starting purity and defect density of the electrode material, as well as other properties resulting from the growth process; fewer initial defects in the crystal result in fewer crystal plane deformation sites caused by the training. With little or no crystalline plane distortion at the end of training, the electrodes' van der Waals channels retain the ability to be easily penetrated by the electrolyte ions, and can correspondingly develop a double layer in a short time period. Also of importance is the fact that the training process widens the van der Waals channels beyond their elastic limit; the channels thus do not later shrink to a smaller dimension.

Figure 3:
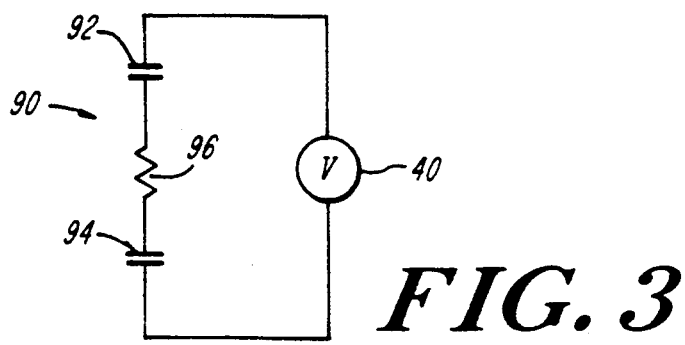
FIG. 3 is a diagram of an equivalent circuit for representing the capacitors of FIGS. 1A and 1B.

Referring now to FIG. 3, the capacitors described above are electrically modelled as a circuit 90 with the applied voltage 40, including a first capacitor 92 and a second capacitor 94, separated by a resistance 96. The resistance 96 is that of the electrolyte, and is typically about 0.003 $\Omega$. For the single intercalation compound-electrode capacitor (FIG. 1A) the first capacitor 92 corresponds to the double layer capacitance of that electrode 20, while the second capacitor 94 corresponds to the capacitance of the electrically conducting container 35. In practice, as a result of the container material, this capacitance is many orders of magnitude lower than that of the electrode 20. As a result, the series capacitance of the two capacitors is swamped by the smaller capacitor 94. Accordingly, the double intercalation compound capacitor (FIG. 1B) is the more preferable scheme; here the two capacitors 92, 94 represent the double layer capacitances of the two electrodes 20. If each electrode is identically constructed, thereby exhibiting the same capacitance, the overall series capacitance of the capacitor is maximized.

Double electrode capacitors of the design and materials described above have been made and exhibit between 30-100 farads per cubic centimeter and an internal resistance of approximately 0.02 $\Omega/cm^2$. This extremely low internal resistance provides the ability to achieve high power in the capacitor discharge. Theoretically, a monocrystalline capacitor structure of pure and defect-free bismuth chalcogenide would exhibit 1000 farads per cubic centimeter. Double layer capacitors having $Bi_2Te_3$ electrodes have been charged to 2.6 volts and observed to exhibit no specific energy degradation for up to 1000 cycles. Table 3 below tabulates the specific energy of this capacitor for corresponding electrolytic solutions.

TABLE 3

| Electrolyte Solution Concentration Mole Part | Specific Energy $J/cm^3$ |
|---|---|
| 0.5 M $LiClO_4$ in PC | 70 |
| 1 M $LiClO_4$ in PC | 105 |
| 1.5 M $LiClO_4$ in PC | 98 |

Other embodiments of capacitor materials and training schemes are intended as included within the spirit and scope of the invention.

What is claimed is:

1. A double layer electrolytic capacitor comprising two electrodes each in contact with a common liquid electrolyte, at least one of said electrodes comprising a crystalline material characterized by the presence of van der Waals channels, the van der Waals channels being adapted to accommodate the electrolyte within the channels, whereby a double layer of charge is formed at interfaces of the van der Waals channels and the electrolyte when a voltage is applied between the two electrodes.

2. The capacitor of claim 1 wherein both electrodes comprise said crystalline material.

3. The capacitor of claim 2 wherein said two electrodes each comprise a monocrystal of said crystalline material.

4. The capacitor of claim 2 wherein said two electrodes each comprise monocrystalline powder particles of said crystalline material.

5. The capacitor of claim 2 wherein said crystalline material is a bismuth chalcogenide.

6. The capacitor of claim 2 wherein said crystalline material comprises a solid solution of $Bi_x(Te_{3-y}Se_y)$, where x is 1 or 2, and y is 0-3.

7. The capacitor of either of claims 2 or 5 wherein said electrolyte comprises a 1.0 M $LiClO_4$ solution in propylene carbonate.

8. The capacitor of either of claims 2 or 5 wherein said electrolyte comprises a 1.2 M solution of organic cation of perchlorate in a mixture of propylene carbonate in dimethoxyethane.

9. The capacitor of claim 2 wherein said electrolyte comprises an aqueous solution of potassium hydroxide.

10. The capacitor of claim 2 wherein said electrolyte comprises an aqueous solution of single valence metal sulphates.

11. The capacitor of claim I wherein one of said electrodes comprises an electrically conducting container in which said electrolyte and said other electrode are positioned.

12. The capacitor of claim 4 wherein said monocrystalline powder comprises monocrystalline particles of approximately 70 microns in a largest dimension.

13. The capacitor of claim 12 further comprising a binding agent for binding together said monocrystalline powder particles.

14. The capacitor of claim 13 wherein said binding agent comprises 5% polyethylene dispersed in acetone.

15. The capacitor of claim 13 wherein said binding agent comprises a 3% carboxymethylcellulose solution in water.

16. The capacitor of either of claims 2 or 5 wherein said van der Waals channels are adapted to accommodate the electrolyte by a training process comprising intercalation of the electrolyte into the van der Waals channels.

17. The capacitor of claim 16 wherein said intercalation is produced by the application of a voltage between said electrodes, said voltage being sufficiently high to achieve solvated ionic complex penetration of said channels.

18. The capacitor of claim 17 wherein said voltage is periodically reversed in polarity between the electrodes.

19. The capacitor of claim 18 wherein said voltage is increased over time from a first voltage sufficient to produce faradaic processes in the electrolyte to a second voltage sufficient to achieve electrolyte penetration of said channels.

20. The capacitor of claim 19 wherein said voltage is applied to said electrodes for approximately 600 minutes.

21. The capacitor of claim 20 wherein said voltage is reversed in polarity approximately every 30 minutes.

22. The capacitor of claim 18 wherein said capacitor is periodically discharged across a resistive load.

* * * * *